(12) United States Patent
McLellan et al.

(10) Patent No.: US 11,743,828 B2
(45) Date of Patent: Aug. 29, 2023

(54) SYSTEMS AND METHODS OF MONITORING AND REPLACING BATTERIES

(71) Applicant: United States Postal Service, Washington, DC (US)

(72) Inventors: Charles P. McLellan, Fairfax, VA (US); Sheetal J. Sonis, Herndon, VA (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 0 days.

(21) Appl. No.: 16/383,357

(22) Filed: Apr. 12, 2019

(65) Prior Publication Data

US 2019/0327682 A1    Oct. 24, 2019

Related U.S. Application Data

(60) Provisional application No. 62/660,827, filed on Apr. 20, 2018.

(51) Int. Cl.
*H04W 52/02* (2009.01)
*H04W 4/029* (2018.01)
*G06Q 10/087* (2023.01)

(52) U.S. Cl.
CPC ....... *H04W 52/0251* (2013.01); *H04W 4/029* (2018.02); *G06Q 10/087* (2013.01)

(58) Field of Classification Search
CPC ............. H04W 4/029; H04W 28/0215; H04W 28/0226; H04W 28/0236; H04W 48/18; H04W 52/0251; H04W 4/02; H04W 52/0277; H04W 52/0296; H04W 52/0209; H04W 52/0219; H04W 52/0264; H04W 52/028; H04W 64/00; G06Q 10/087; G06Q 30/0261; G06Q 30/0267; G06Q 30/0633; G06Q 30/0639; G06Q 30/0641; G06Q 10/0833; G06Q 10/08; G06Q 10/30; G06Q 20/18; G06Q 20/20; G06Q 20/3224; G06Q 50/163
See application file for complete search history.

(56) References Cited

U.S. PATENT DOCUMENTS

| | | | |
|---|---|---|---|
| 2013/0124362 A1* | 5/2013 | Katcher | G06Q 30/0633 705/26.8 |
| 2014/0354291 A1* | 12/2014 | Kikuchi | H01M 10/441 324/434 |
| 2015/0112704 A1* | 4/2015 | Braun | G06Q 10/20 705/2 |

(Continued)

*Primary Examiner* — Srilakshmi K Kumar
*Assistant Examiner* — Jing Gao
(74) *Attorney, Agent, or Firm* — Knobbe, Martens, Olson & Bear LLP

(57) ABSTRACT

A system and method for increasing device efficiency by monitoring and replacing batteries. The system includes a mobile computing device and a data repository, where the data repository is configured to detect a unique device identification, a unique battery identification, a geographic location of the device, and battery information such as the current life of the battery and the number of times the battery has been charged. The mobile computing device in the system communicates the data repository to a processor. The processor calculates when a new battery is needed and the system ships a replacement battery to the facility closest to the location of the device.

20 Claims, 13 Drawing Sheets

(56) References Cited

U.S. PATENT DOCUMENTS

| | | | |
|---|---|---|---|
| 2015/0235171 A1* | 8/2015 | Parris | G06Q 10/0833 |
| | | | 705/333 |
| 2016/0277879 A1* | 9/2016 | Daoura | H04W 4/029 |
| 2017/0193443 A1* | 7/2017 | Barcala | H04W 4/029 |
| 2018/0130011 A1* | 5/2018 | Jacobsson | H05K 13/021 |
| 2018/0253788 A1* | 9/2018 | Takatsuka | G06Q 30/06 |

* cited by examiner

*FIG. 3A*

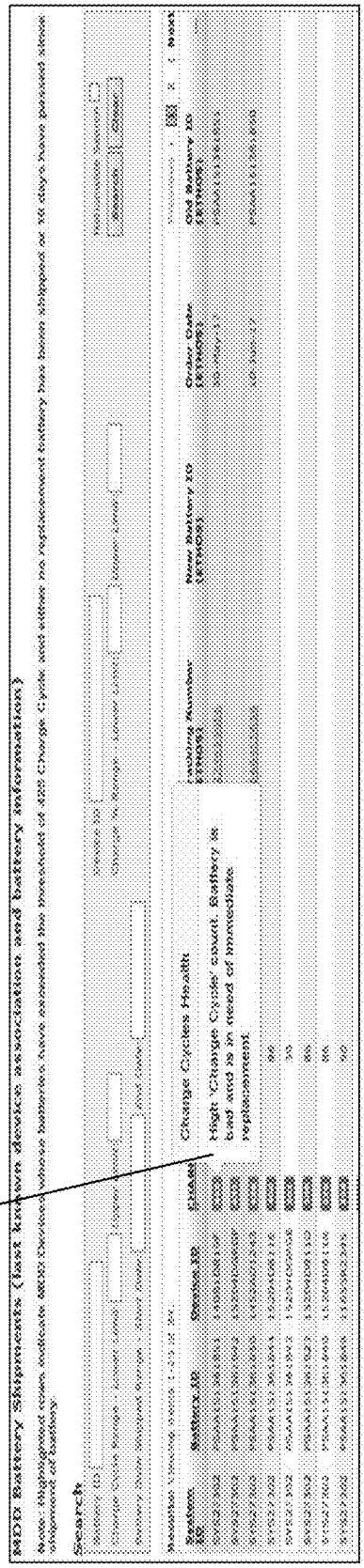

FIG. 3D

MOD Battery Locator (last known device association and battery information)

Note: Highlighted rows indicate MOD Devices whose batteries have exceeded the threshold of 435 Charge Cycle and either no replacement battery has been shipped or 10 days have passed since shipment of battery.

| System ID | Battery ID | Device ID | SW Version | CHARGE CYCLES ∨ | Charge % | Date Shipped (ETHOS) | Tracking Number (ETHOS) | Order Date (ETHOS) |
|---|---|---|---|---|---|---|---|---|
| SYS27302 | PSAA1513B1853 | 15B1085F | 4.05 | ▓▓ | 97 | | | |
| SYS27302 | PSAA1513B1845 | 152BOGK8A | 03.17 | ▓▓ | 14 | | | |
| SYS27302 | PSAA1513B1868 | 152A0B249 | 4.12 | ▓▓ | 86 | 15-May-17 | (link) | 10-May-17 |
| SYS27302 | PSAA1513B1843 | 152B0B11E | 03.17 | ▓▓ | 86 | | | |
| SYS27302 | PSAA1513B1823 | 152B0B11D | 03.17 | ▓▓ | 30 | | | |
| SYS27302 | PSAA1513B1999 | 152B0GK82 | 03.17 | ▓▓ | 86 | | | |
| SYS27302 | PSAA1513B1388 | 152B0B11A | 03.17 | ▓▓ | 30 | | | |
| SYS27302 | PSAA1513B1853 | 152B0GK60 | 03.17 | ▓▓ | 100 | 24-May-18 | (link) | 24-May-18 |
| SYS27302 | PSAA1513B1589 | 15B1085GO | 53.27 | ▓▓ | | | | |
| SYS27302 | PSAA1513B1824 | 152B0B11C | 03.17 | ▓▓ | 86 | | | |

SYSTEMS AND METHODS OF MONITORING AND REPLACING BATTERIES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This Application claims the benefit of priority to U.S. Provisional Application No. 62/660,827, filed Apr. 20, 2018, the entire contents of which are incorporated by reference.

BACKGROUND

Field

The present disclosure relates to automated systems and methods of ensuring adequate battery performance and life for mobile computing devices.

SUMMARY

In one aspect described herein, a system for tracking battery usage comprises a mobile computing device comprising: a unique device identifier; a battery comprising a battery identifier; and a memory configured to store battery information; a processor in communication with the mobile computing device configured to: receive the battery identifier and the battery information from the mobile computing device; determine a battery status based on the battery information; and when the battery status indicates the battery exceeds a determined battery threshold, cause a new battery to be ordered for the mobile computing device.

In some embodiments, the battery information comprises one or more of a current battery life of the battery and a number battery cycles.

In some embodiments, the determined battery threshold comprises a number of battery charge cycles.

In some embodiments, the determined battery threshold comprises full charge amp-hours.

In some embodiments, the determined battery threshold comprises a comparison between charge percent and item of use.

In some embodiments, the system further comprises an inventory management system configured to receive the order for the new battery from the processor, and to ship a new battery to a facility with which the mobile computing device is associated.

In some embodiments, the processor is further configured to send a signal to the mobile computing device for which the new battery has been ordered.

In some embodiments, the signal actuates a visual or audible signal on the mobile delivery device for which the new battery has been ordered.

In some embodiments, the mobile computing device further comprises a location detection circuit, wherein the location detection circuit is configured to detect a geographic location of the mobile computing device and to record in the memory the geographic location.

In some embodiments, the processor is configured to, based on the battery status, instruct the mobile computing device to change the frequency with which the geographic location is recorded in the memory.

In another aspect described herein a method for tracking battery usage comprises receiving, from a battery-powered mobile computing device a battery identifier and battery information; determining, in a processor, a battery status based on the received battery information; when the battery status indicates the battery exceeds a determined battery threshold, causing, in a processor, a new battery to be ordered for the mobile computing device.

In some embodiments, the battery information comprises one or more of a current battery life of the battery and a number battery cycles.

In some embodiments, the determined battery threshold comprises a number of battery charge cycles.

In some embodiments, the determined battery threshold comprises a comparison between charge percent and item of use.

In some embodiments, the method further comprises receiving, in an inventory management system the order for the new battery; and shipping, in response to the order, the new battery to a facility with which the mobile computing device is associated.

In some embodiments, the method further comprises sending, by a processor, a signal to the mobile computing device for which the new battery has been ordered.

In some embodiments, the signal actuates a visual or audible signal on the mobile delivery device for which the new battery has been ordered.

In some embodiments, the method further comprising, recording, in memory of the mobile a geographic location determined by a location detection circuit of the mobile computing device.

In some embodiments, the method further comprises, instructing, via a processor, the mobile computing device to change the frequency with which the geographic location is recorded in the memory, based at least in part on the determined battery status.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

FIG. 3A is an example image of a report entitled "MDD Battery Shipments" generated based on the data transmitted to a management module in a system for monitoring and replacing batteries.

FIG. 3B is an example image of a report entitled "MDD Battery Shipments" generated based on the data transmitted to a management module in a system for monitoring and replacing batteries.

FIG. 3C is an example image of a report entitled "MDD Battery Shipments" generated based on the data transmitted to a management module in a system for monitoring and replacing batteries.

FIG. 3D is an example image of a report entitled "MDD Battery Shipments" generated based on the data transmitted to a management module in a system for monitoring and replacing batteries.

FIG. 3E is an example image of a report entitled "MDD Battery Locator" generated based on the data transmitted to a management module in a system for monitoring and replacing batteries.

FIG. 4 is an example image of a report entitled "MDD Battery Exception Report for Yesterday" generated based on the data transmitted to a management module in a system for monitoring and replacing batteries.

FIG. 5 is an example image of a report entitled "Current MDD Battery Status" generated based on the data transmitted to a management module in a system for monitoring and replacing batteries.

FIG. 7 is an example image of a report entitled "Excessive Battery Swap Exception Report For Yesterday" generated based on the data transmitted to a management module in a system for monitoring and replacing batteries.

FIG. 8 is an example image of a report entitled "Low Battery Repeat Offender Report" generated based on the data transmitted to a management module in a system for monitoring and replacing batteries.

DETAILED DESCRIPTION

Figure 1A:
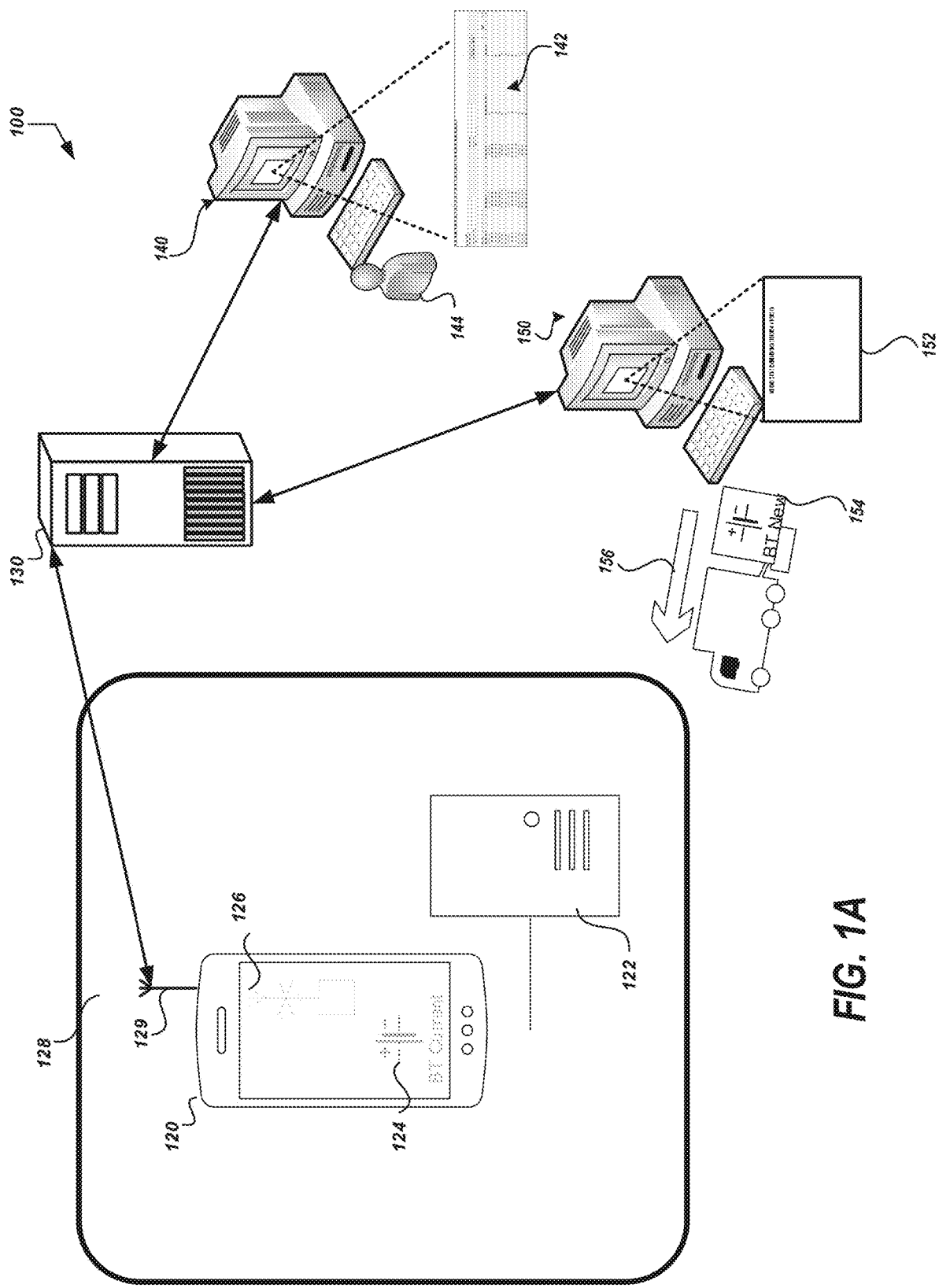
FIG. 1A is a system diagram of an exemplary an automated system for monitoring and providing replacement batteries.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

As the disclosure allows for various changes and numerous embodiments, particular embodiments will be illustrated in the drawings and described in detail in the written description. Reference in the specification to "one embodiment," "an embodiment", or "in some embodiments" means that a particular feature, structure, or characteristic described in connection with the embodiment is included in at least one embodiment of the invention. Moreover, the appearance of these or similar phrases throughout the specification does not necessarily mean that these phrases all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments. The illustration of certain embodiments in the drawings and written description is not intended to limit the present disclosure to particular modes of practice, and it is to be appreciated that all changes, equivalents, and substitutes that do not depart from the spirit and technical scope of the present disclosure are encompassed in the present disclosure. As used herein, the term "and/or" includes any and all combinations of one or more of the associated listed items.

Embodiments of the present disclosure will be described below in more detail with reference to the accompanying drawings. Those components that are the same or are in correspondence are rendered the same reference numeral regardless of the figure number, and redundant explanations are omitted.

It will be understood that although the terms "first", "second", etc. may be used herein to describe various components, these components should not be limited by these terms. These components are only used to distinguish one component from another.

The term "about" can refer to a variation of ±5%, ±10%, ±20%, or ±25% of the value specified. For example, "about 20" percent can in some embodiments carry a variation from 15 to 25 percent. For integer ranges, the term "about" can include one or two integers greater than and/or less than a recited integer at each end of the range. Unless indicated otherwise herein, the term "about" is intended to include values, e.g., weight percentages, proximate to the recited range that are equivalent in terms of the functionality of the individual ingredient, the composition, or the embodiment. The term about can also modify the end-points of a recited range as discuss above in this paragraph.

It will be further understood that the terms "comprises" and/or "comprising" used herein specify the presence of stated features or components, but do not preclude the presence or addition of one or more other features or components.

A distribution network can use mobile computing devices for many purposes within the distribution network. In the case of the United States Postal Service (USPS), carriers, supervisors, clerks, and other entities/users utilize Mobile Delivery Devices (MDDs). MDDs are handheld scanners that allow persons utilizing them, such as U.S. Postal Service carriers to track package delivery, carrier position, delivery status, route status, route directions, and many other features.

Many processes within a distribution network rely on the functionality of the MDDs. Accordingly, the functionality of MDD devices are important: screen freezes, laser beam reader freezes, and insufficient battery life are exemplary problems that impair the MDD devices and can result in inefficient package handling. Inadequate MDD functionality and spare parts management can cause mail and service delays, which may reduce customer satisfaction and result in lost clients. Accordingly, it is an object of the present embodiments to provide systems and methods to improve the efficiency and functionality of MDD devices including a system for monitoring the battery health and battery life and ensuring adequate charge for mobile computing devices a. The various embodiments described herein advantageously fill the aforementioned deficiencies by providing new systems and methods that can monitor the life of a battery and provide a replacement battery at a specified time before the deficient battery becomes a problem.

As used herein, an item can be a mobile delivery device (MDD) or any other item that requires a specified amount of battery life to achieve its function. A facility may be an entity configured to store, house, disperse, manage, or otherwise use and handle battery powered devices, such as USPS, a carrier, a storage facility, a fulfillment warehouse, a luggage sorting facility, or any other similar facility, company, or entity.

In some aspects of the present disclosure, are systems and methods for monitoring battery life and providing replacement batteries as needed are described to improve the efficiency of battery containing devices, such as mobile delivery devices. The battery replenishment process is an automated process where the management module sends information regarding insufficient batteries in battery containing devices to the shipment system at least once every week and in return the shipment system ships new batteries. For example, the battery replenishment process may be set to ship new batteries if a device battery has greater than 425 charge cycles. The management module can generate reports to Find Device Batteries, Monitor Battery Shipments, Monitor Battery Exceptions, Monitor Battery Status, Monitor Excessive Battery Swaps, and Monitor Repeat Battery Offenders to aid manager and supervisors in monitoring faulty batteries.

As shown in FIG. 1A a system 100 for monitoring and replacing batteries, which includes a mobile computing device 120 and a data repository 122. The data repository 122 can be an internal memory of the mobile computing device 120, or can be a remote memory with which the mobile computing device communicates wirelessly. The data repository 122 is configured to store and/or receive a unique device identification associated with the mobile computing device 120. The mobile computing device 120 in the system 100 includes a battery 124 having a unique battery identifier. The unique battery identifier can be a serial number, a computer readable code, or the like, and can be printed or disposed on the battery, and/or can be stored within the internal circuitry of the battery 124. The mobile computing device 120 of the system 100 also includes a location detection circuit 126 configured to detect a geographic location (GPS) of the mobile computing device 120.

The data repository 122 of the mobile computing device 120 is configured to receive and store the geographic location determined by the location detection circuit 126. The data repository 122 is also configured to detect, receive, and/or store battery information including the battery state of charge, battery amp-hours used and stored, current battery life, number of battery cycles, number of times the battery has been charged. The data repository can include an SD card and random access memory (RAM).

The system 100 includes a facility 128, such as warehouse, distribution center, post office, and the like, where the facility 128 has a unique facility identification. The location detection circuit 126 is configured to recognize when the mobile computing device 120 is at the facility 128 and to communicate the unique facility identification to the data repository 122. The system includes a hub 130, a processor 140, and an inventory management system 150. The mobile computing device 120 is configured to communicate, via a communications device 129, information regarding the mobile computing device activity, including battery information from the data repository 122 to a hub 130. The hub 130 can comprise a processor, a memory, and a communication feature, or can be running as a module on a server. The hub 130 can be located in the facility 128, or it can be remote from the facility 128. The hub 130 is configured to receive information from the data repository 122. The geographic location determined by the location detection circuit 126 is communicated to a hub 130 at a specified interval, such as every 30 seconds. In some embodiments, the geographic location is determined based on a logical inference. For example, the location of the mobile computing device 120 may not be determined using GPS signals from the location detection circuit 126 when the mobile computing device 120 is inside the facility 128. The system 100 can determine that the previous GPS coordinate before the device 120 stopped determining its location via GPS was at, near, or within a geofence of the facility. Until the device 120 records subsequent GPS signal at a location other than the facility, the system 100 determines that the device 120 is at the facility 128.

In some embodiments, the mobile computing device 120 writes to an SD card or other memory device in the data repository 122 every one second when it is in normal mode. Normal mode can be used when the battery 124 of the device 120 has sufficient battery life, or a state of charge of 2200 mAh or more. When the battery 124 of the device 120 is in low power mode, or if the battery has a state of charge less than 2200 mAh, the device automatically turns off some features such as communicating GPS location data every 30 seconds. Instead the device 120 in low power mode communicates GPS location data less often, such as every one minute or every two minutes. When the device is in survival mode, which can be when the state of charge is less than 750 mAh, the device automatically turns of more features. In survival mode, the mobile computing device 120 can turn off all communication and increase the memory buffer to allow the mobile computing device 120 to store more information in RAM and write to the SD card or internal memory less often, which saves battery power. In normal mode the mobile computing device 120 transmits position information, scan information, accelerometer data, and other device data to the hub 130 every minute, or at a given periodicity. As described herein, when the device goes to low power mode or survival mode, the frequency of transmitting information to the hub 130 via the communication module 129 is reduced.

The hub 130 receives battery information from the data repository 122 and determines when the battery 124 should be serviced or replaced. The hub 130 is also in communication with an inventory management system 150, which is configured to automatically generate an order 152 to ship a new battery 154 to the facility 128 where the mobile computing device 120 is located based on the unique facility identification communicated to the hub 130. The inventory management system 150 is configured to automatically ship 156 the new battery 154 to the facility 128. In the system 100, the hub 130 communicates with a processor 140 where the processor 140 processor 140 is configured to receive information from the hub 130. The hub 130 calculates various information based on the data repository 122 received from the mobile computing device 120. The information calculated and the data repository 122 received is used to generate reports as exemplified by FIGS. 2-8. The processor 140 is in communication with the hub 130 and is configured to generate and display reports 142 generated by information received from the hub 130. The different reports 142 generated are exemplified by FIGS. 2-8 and are viewable by a user 144.

Figure 1B:
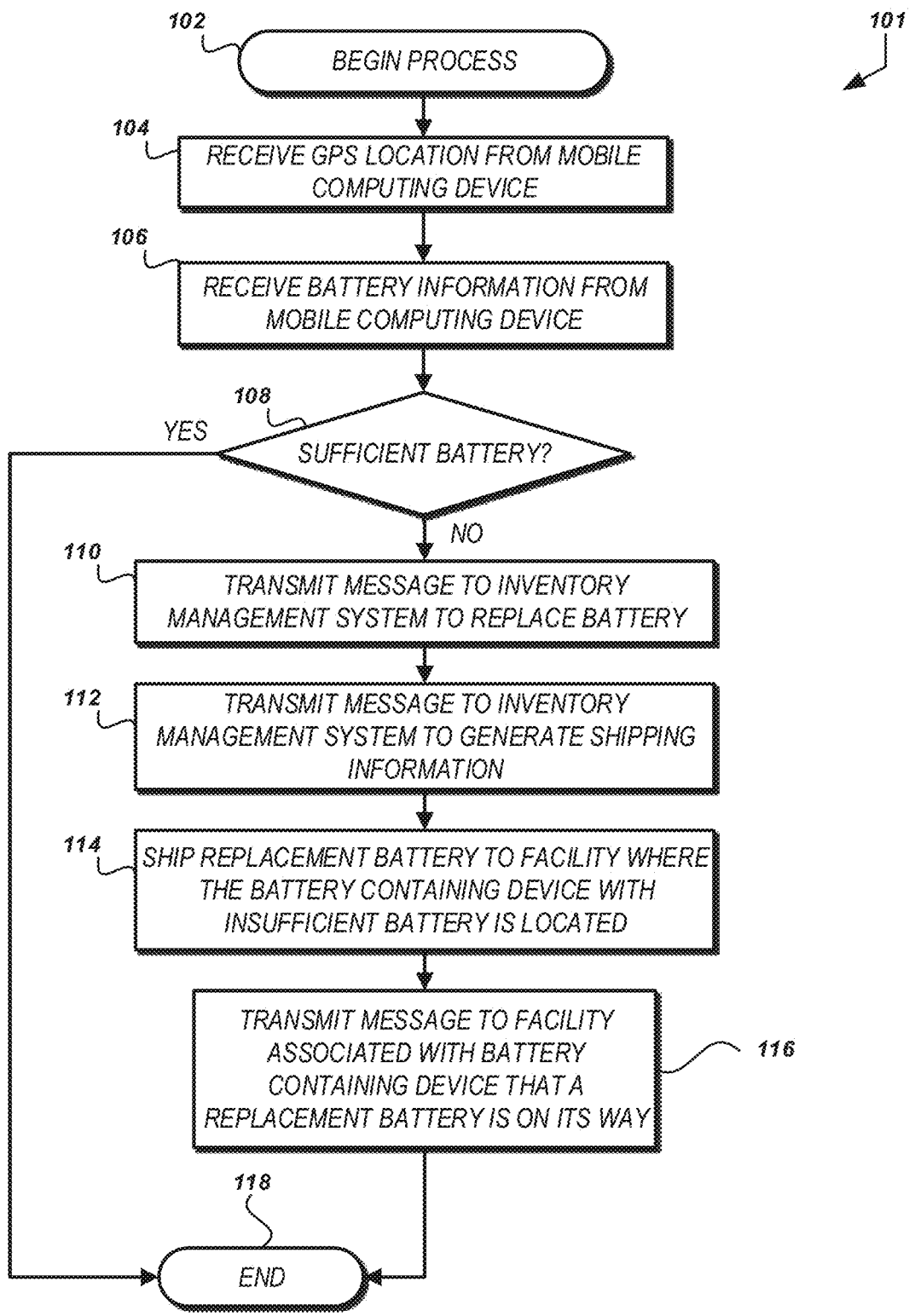
FIG. 1B is an example flow diagram of a method for monitoring and replacing batteries.

FIG. 1B is a flow diagram illustrating an example method of monitoring and shipping replacement batteries to a device in need of such replacement batteries. The process 101 may be implemented by one or more of the devices described herein. The process 101 illustrates one way a mobile computing device 120 can transmit information that the battery 124 needs to be replaced and generate a control message for shipping a replacement battery 154. The process 101 begins at block 102. mobile computing device 120 The mobile computing device 120, such as an MDD, records data at specified intervals, such as once per second, or at more or less frequent intervals, or continuously, and transmits data to a management module, including GPS location at a specified interval. The transmission interval can be the same as the recording interval, or it can be any other desired time interval, for example, every minute. At block 104, a hub 130 may receive the data, including GPS location, battery state of charge, and the like, from the mobile computing device 120. Some battery information from the mobile computing device, for example, information related to the number of charge cycles or health of the battery is only transmitted at a different interval, for example, once a day. At block 106, a hub 130 may receive battery information from the mobile computing device 120. The information may show the device has sufficient battery strength/life for the carrier to complete his or her route or tasks for the day, that the battery is in need of replacement in the near future, needs to be replaced at the end of the day, or needs to be replaced immediately. At block 108, if the device 120 has sufficient battery strength/life to complete a route for the day, or for some other interval, such as 1 week, 1 month, etc., then an affirmative determination will determine that no action is to be taken with regard to that battery, the process 101 proceeds to block 118, where the process 101 ends.

However, at block 108, if the device 120 has insufficient battery strength/life and the determination is negative, then the hub 130 will transmit a message to an inventory management system to replace the battery as shown in block 110.

At block 112, the hub 130 may transmit a message to the inventory management system to generate shipping information and allocate a new battery for sending to the facility 128. Shipping information is based on the facility 128 at which the mobile computing device was last located, based on the GPS location or with which the mobile computing device is associated. The facility 128 information may be termed the "System ID." Each facility 128 has a unique System ID with an associated shipping address. At block 114, the shipping information is used to ship a replacement battery 154 to the facility 128 where the mobile computing device 120 with the insufficient battery was last located. At block 116, a message is transmitted to the facility 128 associated with the mobile computing device 120 that a replacement battery 154 for that particular device 120 is on its way. The process 101 may end at block 118.

As a battery arrives at the facility 128, the hub 130 will record a confirmation of delivery of the new battery 154 at the facility 128. The hub 130 will track the arrival of the batteries 154 and will cross-check the identifiers of the new batteries 154 with the battery ID's of the batteries being used with the mobile computing devices 120. In this way, the hub 130 can determine whether the new batteries 154 shipped to the facility 128 were actually used to replace old, used, or spent batteries.

If the hub 130 sees that the battery ID for one or more of the new batteries 154 appears in a report showing the battery IDs for the mobile computing devices 120 in use at the facility 128, then the hub 130 can determine that those new batteries 154 have been installed in the mobile computing devices 120. If the hub 130 does not see the new battery 154 ID in use with a mobile computing device 120 at the facility 128 within a set time period, such as one day, on week, and the like, the hub 130 can send a message, signal, alert, or other indication to an operator, a supervisor at the facility 128 or at the battery shipping location, or any other location, that the new battery 154 needs to be installed.

In some embodiments, when the hub 130 determines that the new batteries 154 have arrived at the facility, the hub 130 can communicate to the mobile computing device 120 for which the new battery 154 is intended, or can communicate to a network in connection with the mobile computing device, or to a charging cradle or other similar device in communication with the mobile computing device 120, and can cause the mobile communication device 120 to provide an audible and/or visual indication.

For example, in a facility 128, a plurality of mobile computing devices 120 may be stored on charging cradles awaiting their next use. Personnel at the facility 128 receive new batteries 154 for a few of the mobile computing devices. The hub 130 causes the mobile computing devices 128 which are to be replaced to light up, to display a message on the screen, to activate a light, such as an LED, or otherwise provides an indication. In some embodiments, the hub 130 causes the charging cradle in which the mobile computing devices 120 are located to actuate a visual signal, such as a flashing light, or an audible signal, or both. Otherwise, facility 128 personnel would be required to check the serial number of each mobile computing device 120 and cross-reference with a report to identify which mobile computing device 120 should receive a new battery 154. The facility 128, may have more than 50, more than 100, or more mobile computing devices 120 associated therewith, depending on the size of the facility, the number of carrier routes serviced, and/or item volume handled by the facility.

In some embodiments, personnel may be unloading new batteries 154, and may scan a computer readable code located on the new battery 154, or may type in the battery identifier into an interface. When the new battery identifier is received 154 via a scan or typing in the identifier, the hub 130 or the processor 140 can determine which of the plurality of mobile computing devices 120 at the facility 128 need a replacement battery. The hub 130 or the processor 140 can cause the mobile computing devices 120 needing new batteries or the charging cradles housing those mobile computing devices 120 to flash, emit an audible signal, turn on the screen, display a message on the screen, and the like. The signal can be send wirelessly to the mobile communication device 120 through a communication module of the hub 130, or can be communicated from the hub via a wired or wireless connection to the charging cradle. The hub 130 stores an association between charging cradles and the mobile computing devices 120 housed therein, thus, the hub 130 can send a signal for specific mobile computing device 120 to the charging cradle in which the mobile computing device 120 is located.

Figure 2A:
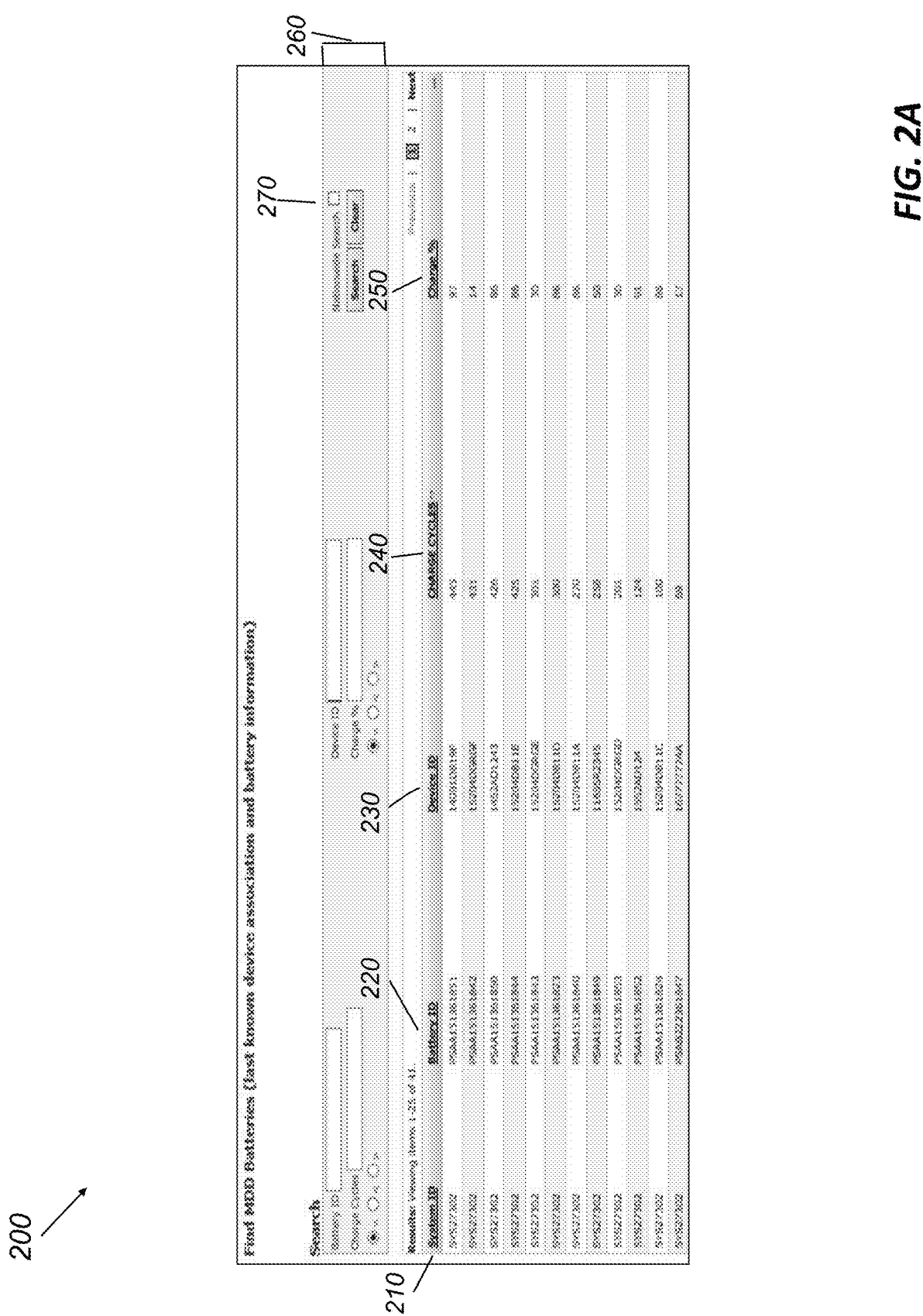
FIG. 2A is an example image of a report entitled "Find MDD Batteries" generated based on the data transmitted to a management module in a system for monitoring and replacing batteries.
Figure 2B:
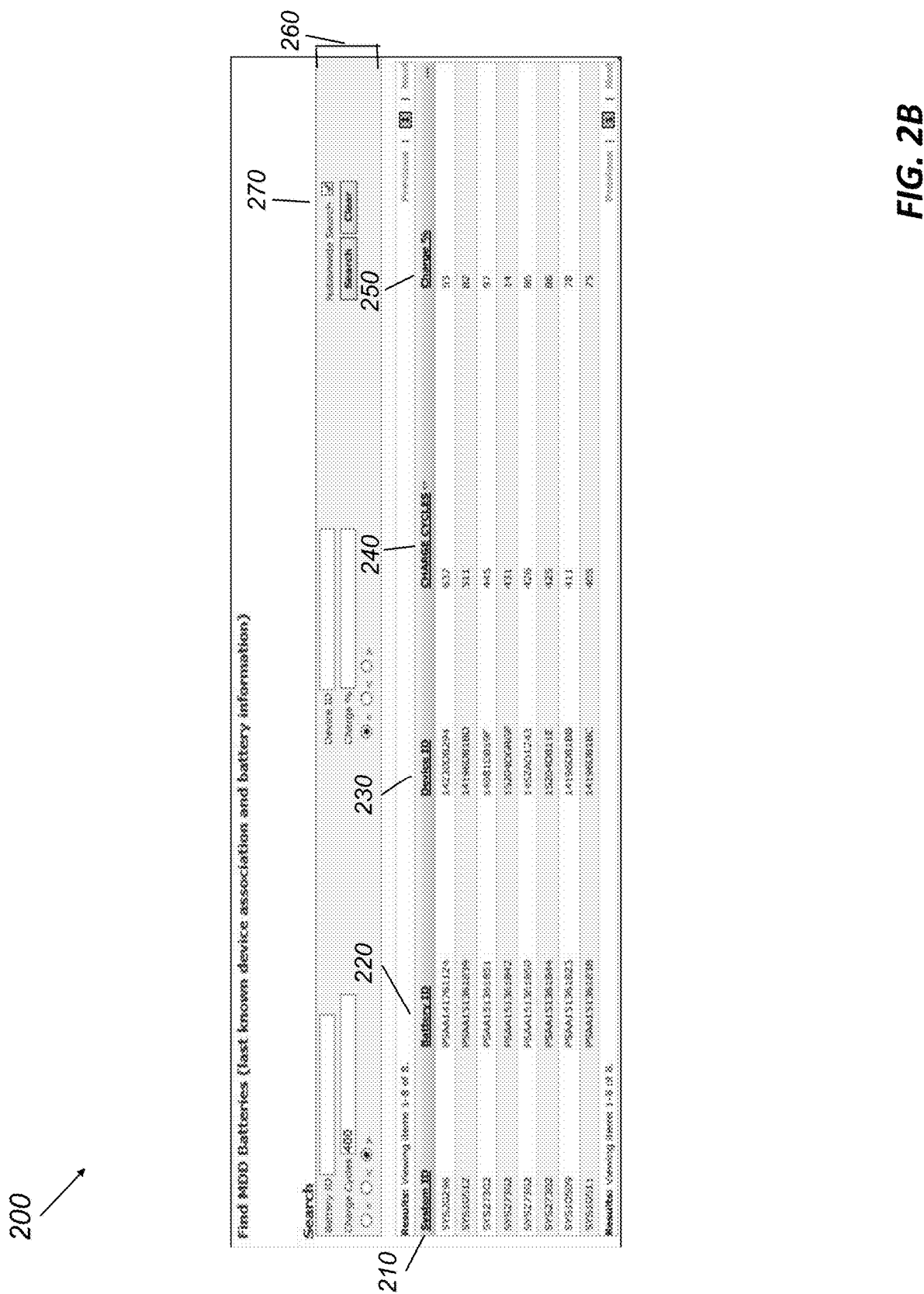
FIG. 2B is an example image of a report entitled "Find MDD Batteries" generated based on the data transmitted to a management module in a system for monitoring and replacing batteries.

FIGS. 2A and 2B show example images of a report entitled "Find MDD Batteries" 200 that may be generated based on the data 122 transmitted to a management module in a system for monitoring and replacing batteries. The "Find MDD Batteries" report in FIGS. 2A and 2B is based on battery information of a device 120, such as a mobile delivery device, transmitted to the module. The Find MDD Batteries report 200 lists all of the battery/device pairs for the current facility 128 (labeled the System ID 210), and the battery status for each battery. Each row of the report 200 lists the "System ID" 210, the "Battery ID" 220, the "Device ID" 230, the "Charge Cycles" 240, and the "Charge %" 250. By default, the report 200 is sorted in descending order by Charge Cycles 240 but the report 200 can be sorted based on any of the columns, "System ID" 210, the "Battery ID" 220, the "Device ID" 230, the "Charge Cycles" 240, and the "Charge %" 250. The System ID 210 of the report 200 is connected to a unique facility 128, such as a postal facility, where the device 120 is stored when it is not being used, or with which the mobile computing device 120 is associated. Each individual battery 124 has a unique battery ID that is reported as the Battery ID 220. Each mobile computing device 120, such as a mobile delivery device, has its own unique device ID that is reported as the Device ID 230. The Charge Cycles 240 is the number of times the battery has been fully charged or has been fully charged and then partially, mostly, or completely discharged. The Charge % 250 is the strength of the battery when it is first used for the day and is calculated based on the strength of the device when the first GPS data 126 and battery information 122 is received from the device 120 holding the battery 124. The report 200 can be exported to an EXCEL or CSV file for reporting or further analysis. The report is searchable by the fields shown in the Search panel 260, namely "Battery ID" 220, the "Device ID" 230, the "Charge Cycles" 240, and the "Charge %" 250. If desired, the user can check the Nationwide Search box 270 to get a listing of all Device/battery pairs in the nation.

FIG. 2B shows a distribution network search for all devices 120 with a battery 124 having a charge cycle of 400 or greater. Similar searches can be done for the other fields. The default search can be set according to a hierarchy, based on an area of responsibility of a supervisor or other entity doing the searching. Although not shown, it will be understood that the search can be limited by the "System ID" which allows for a search at a particular facility 128 to be performed.

Figure 3A:
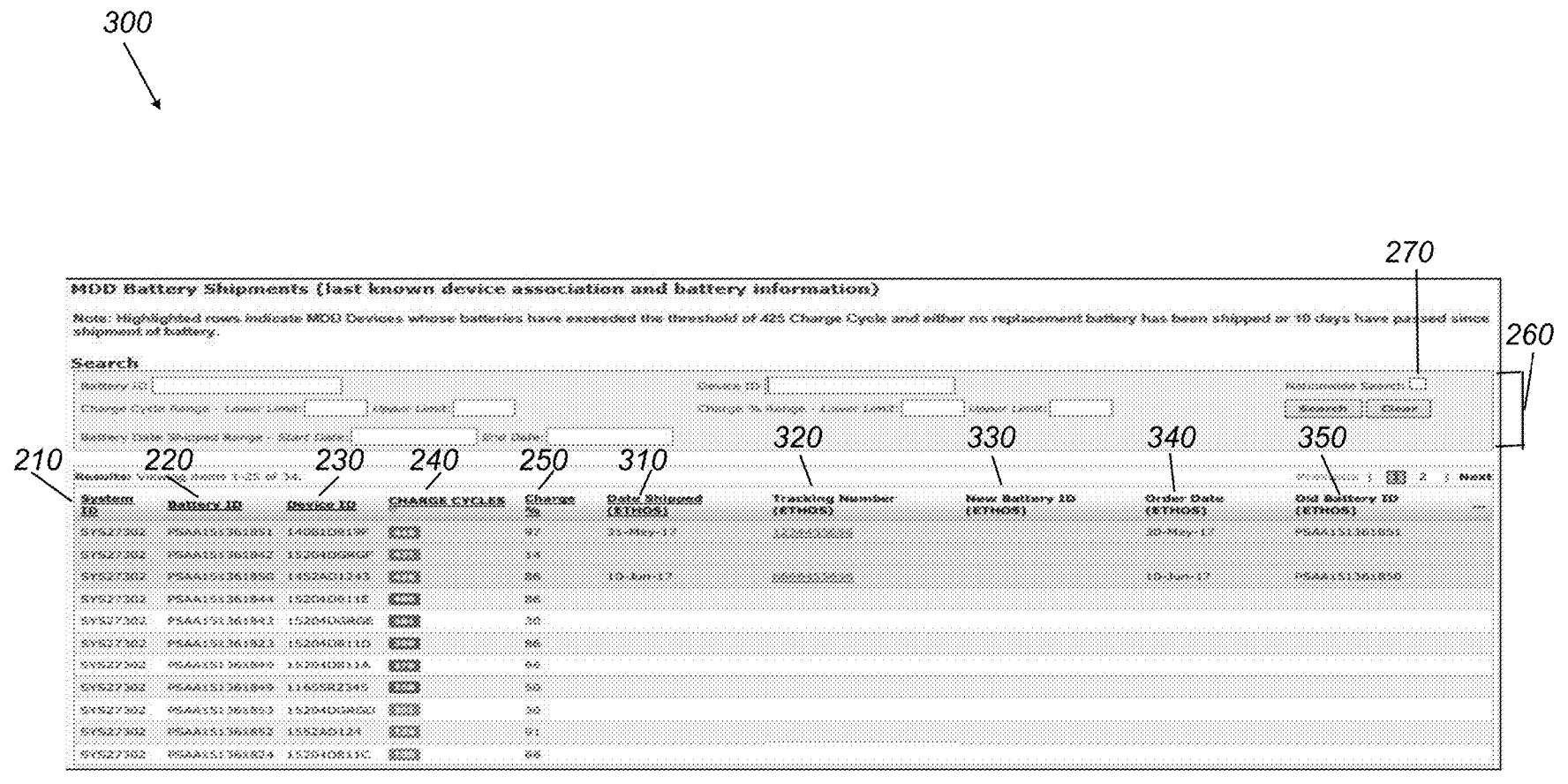

FIG. 3A shows an example image of a report entitled "MDD Battery Shipments" 300 that may be generated based on the data 122 transmitted to a management module in a system for monitoring and replacing batteries. The "MDD Battery Shipments" report 300 displays a list of unique devices 330 and the unique battery 320 that is currently in the unique device 330 for the specified System ID 210. The purpose of the "MDD Battery Shipments" report 300 is to monitor the health of the batteries 124 and the status of battery orders that are currently in process. The rows of the report 300 lists the "System ID" 210, the "Battery ID" 220, the "Device ID" 230, the "Charge Cycles" 240, the "Charge %" 250, the "Date Shipped" 310, the "Tracking Number" 320, the "New Battery ID" 330, the "Order Date" 340, and the "Old Battery ID" 350. The System ID 210 of the report 300 is connected to a unique facility 128, such as a postal facility, where the device 120 is currently being stored when it is not being used. Each individual battery 124 has a unique battery ID that is reported as the Battery ID 220. Each mobile computing device 120, such as a mobile delivery device, has its own unique device ID that is reported as the Device ID 230. The "Date Shipped" 310 is the date the replacement battery 154 was shipped. The "Tracking Number" 320 is the tracking number of the battery shipment 156. The "New Battery ID" 330 is the unique ID associated with the new battery 154 that was shipped to replace the current, insufficient or old battery 124. The "Order Date" is the date the replacement battery 154 was ordered by the module 150. The "Old Battery ID" 350 is the unique ID of the new battery 154.

The MDD Battery Shipments report 300 as shown in FIGS. 3A-3D can be sorted based on the "System ID" 210, the "Battery ID" 220, the "Device ID" 230, the "Charge Cycles" 240, the "Charge %" 250, the "Date Shipped" 310, the "Tracking Number" 320, the "New Battery ID" 330, the "Order Date" 340, and the "Old Battery ID" 350. The MDD Battery Shipments report 300 can be exported to an EXCEL or CSV file for reporting or further analysis. The report 300 is searchable by the fields shown in the Search panel 260, namely the "Battery ID" 220, the "Device ID" 230, the "Lower Limit" and "Upper Limit" of the "Charge Cycle" 240, the "Lower Limit" and "Upper Limit" of the "Charge %" 250, and the "Battery Date Shipped" 310 using both a "Start Date" and/or an "End Date". If desired, the user can check the Nationwide Search box 270 to get a listing of all Device/battery pairs in the nation, which includes the shipment information. Note that if the Nationwide option is selected without any search criteria, the module will generate a huge report. When using this option, the user should identify a specific battery for the search, or narrow the search by using multiple search criteria.

The MDD Battery Shipments Report 300 exemplified in FIG. 3A displays the status of battery orders and shipments. Device/battery pairs for which battery orders/shipments are active are highlighted in yellow. These are for batteries that have met or exceeded the threshold of 425 Charge Cycles 240 and either no replacement battery has been shipped or ten days have passed since shipment of the battery. The highlighted lines may include the "Date Shipped" 310, the "Tracking Number" 320, the "New Battery ID" 330, and the "Order Date" 340, and the "Old Battery ID" 350.

The data in the Charge Cycles column 240 can be color coded or be visually distinct to indicate the current health of a battery 124. For example, in some embodiments, the number of charge cycles can have a background color coding indicating the current health of the battery. If the color coding of the charge cycle 240 number is red, the charge cycles of the current battery 124 is greater than or equal to a specified number, such as 425, or any other desired charge cycle indicating that the battery is bad and in need of immediate replacement. In some embodiments, the number of charge cycles in column 240 can flash or provide other visually distinct indications regarding the need to replace a battery 124, or to warn of deteriorating battery 124 health. In some embodiments of the system, all of the data in the column will flash if the charge cycles 240 of the current battery 124 is greater than or equal to 425 indicating that the device 120 needs a replacement battery 154. Additionally, in some embodiments of the system can send an instruction to the mobile computing device 120 in which the battery 124 which needs to be replaced is used causing an indicator or the screen of the mobile computing device 120 to flash indicating the battery 124 needs replacement 154. This allows the user of the device to choose a different device prior to beginning his work for the day, such as his delivery route. If the color coding of the charge cycle 240 number is blue, the charge cycles 240 of the current battery 124 is between two different specified numbers, such as between 251 and 424, indicating that the battery 124 may start to show signs of degradation. If the color coding of the charge cycle number 240 is green, the charge cycles 240 of the current battery 124 is less than a specified number, such as less than 250, indicating that the battery 124 is new, close to new, and/or is performing at an optimal level. In some embodiments, the determination of whether the battery health is poor can be based on charge percent 250, or any other desired battery characteristic.

Figure 3D:
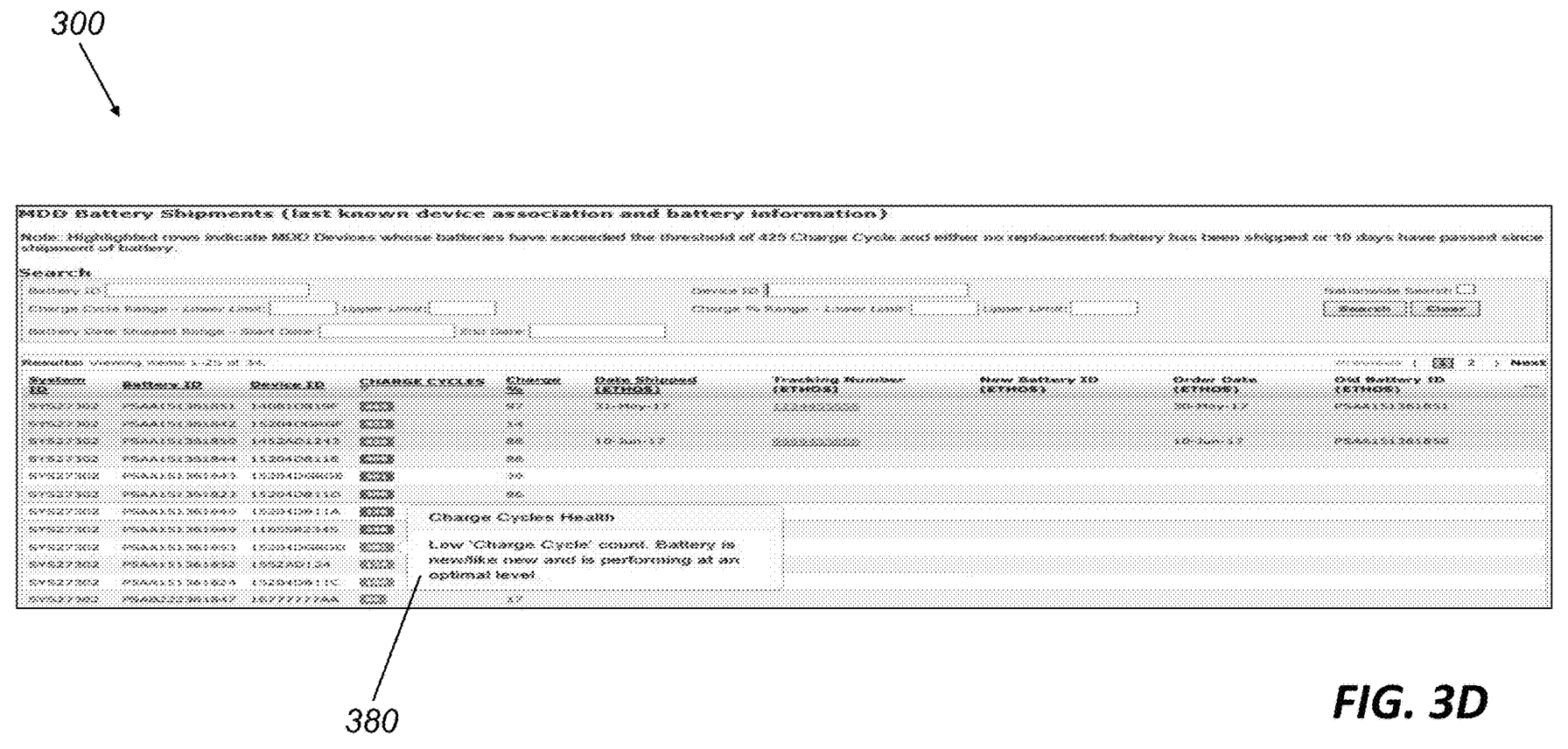

FIGS. 3B-3D show the MDD Battery Shipments Report 300 when an input device, such as a mouse clicks on, taps on, or is hovered over the color-coded Charge Cycles 240 number. The battery health information description for each battery 124 can be viewed by hovering over the charge cycle 240 number with the mouse. FIG. 3B shows the Charge Cycles Health information displayed if the mouse is hovered over a charge cycle number that is highlighted 360, or which has a charge cycle number above the selected threshold. The display 360 indicates that the highlighted number is a High "Charge Cycle" 240 count, the battery 124 is bad, and is in need of immediate replacement 154. FIG. 3C shows the Charge Cycles Health information displayed if the mouse is hovered over a charge cycle number that is highlighted 370. The display 370 indicates that the blue number has a moderate "Charge Cycle" 240 count and the battery 124 may start to show signs of degradation. FIG. 3D shows the Charge Cycles Health information displayed if the mouse is hovered over a charge cycle number that is highlighted 380. The display 380 indicates that the number is a low "Charge Cycle" 240 count and the battery 124 is new/like new and/or is performing at an high level. The high charge cycle number can be highlighted in red, the moderate charge cycle count in blue, and the low charge cycle count in green.

FIG. 3E shows an MDD Battery Locator Report 301. This report can be similar to those described elsewhere herein, including having a system ID 210 column, a battery ID 220 column, a Device ID 230 column, a Charge Cycles 250 column, a Date Shipped Column 310, a Tracking Number 320 column, and an Order Date 340 column. The MDD Battery Locator Report 301 also includes a SW Version 235 column. The SW Version 235 can refer to the software version which is operating on the mobile computing device 120 in the report. This can enable they system or a supervisor to ensure that the devices have the correct, most current, or the assigned software version for each device.

The MDD Battery Locator Report 301 also includes a Find Device button 355, with a column of check boxes underneath. An operator or supervisor can select the mobile computing devices 120 associated with the Device IDs 230 in the Report 301 by clicking, tapping, or selecting the box under the Find Device button 355, and pressing, selecting, clicking, or tapping the Find Device button 355. This causes the hub 130 to send a signal to the selected mobile computing devices 120 and causes an indicator to actuate. For example, the mobile computing devices 120 may light up, turn on, show a message on the screen, and the like. The charging cradles in which the selected mobile computing devices 120 are charging can actuate a light, such as a flashing light, emit a sound, and the like. This enables an operator to quickly access the mobile delivery device 120 that needs attention, maintenance, software update, battery replacement, etc.

The hub 130 can automatically order replacement batteries for batteries according to criteria listed in FIGS. 3A-3E, for example, the hub 130 can automatically order replacement batteries for any device which has a high charge cycle count, or a charge cycle count above a particular threshold. The hub 130 can also be configured to take automatic action based on any of the scenarios or battery reports listed elsewhere herein.

Figure 4:
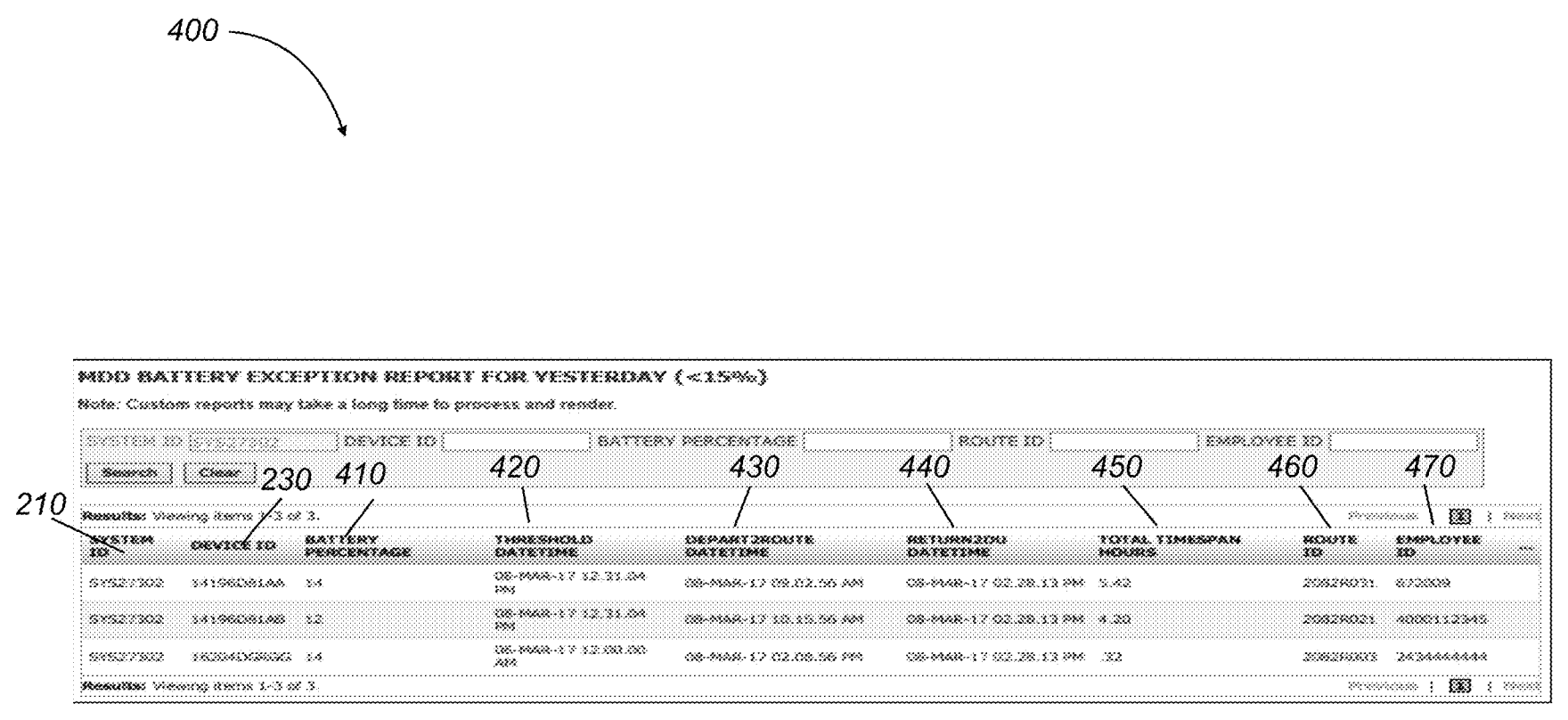

FIG. 4 shows an example image of a report entitled "MDD Battery Exception for Yesterday" 400 that may be generated based on the data 122 transmitted to a management module in a system for monitoring and replacing batteries. The MDD Battery Exception for Yesterday report 400 lists all of the devices with their own unique Device ID 230 at the facility 128 with the current System ID 210, where the battery level went below 15% at some point in the previous day, or in a predetermined prior period of time. The report 400 is exportable to an EXCEL or CSV file. The columns listed in the report 400 are "System ID" 210, "Device ID" 230, "Battery Percentage" 410, "Threshold DateTime" 420, "DEPART2ROUTE DateTime" 430, "RETURN2DU DateTime" 440, "Total Timespan Hours" 450, "Route ID" 460, and "Employee ID" 470. Each mobile computing device 120, such as a mobile delivery device, has its own unique device ID that is reported as the Device ID 230. The "Battery Percentage" 410 column reports the strength of the battery 124 in percentage when it went below the specified threshold level, such as 15% for the first time. The "Threshold DateTime" 420 column reports the first time the battery level went below a specified threshold level, such as a threshold of 15%. A DEPART2ROUTE scan is performed for each mobile delivery device 120 when the device user scans that he or she is on the way from the facility 128 to the specified route with the mobile computing device identified by the device ID 230. The "DEPART2ROUTE DateTime" 430 column reports the time the earliest DEPART2ROUTE scan was made for the day being reported. The column is blank if no DEPART2ROUTE scan was recorded on the device. A RETURN2DU scan is performed for each mobile delivery device 120 when the device user scans that he or she is returning to the facility 128 with the current System ID 210 from the specified route. The "RETURN2DU DateTime" 440 column reports the time the latest RETURN2DU scan was made for the day being reported. The column is blank if no RETURN2DU scan is recorded on the device. The "Total Timespan Hours" 450 column reports the amount of time the device was in use measured by "RETURN2DU DateTime" 440 minus "DEPART2ROUTE DateTime" 430. When both times are not available, the column 450 is blank. The "Route ID" column 460 reports the unique ID associated with the particular route that the device 120 was most recently on. The "Employee ID" column 470 reports the unique ID associated with the most recent employee to use the device 120. The report 400 is sorted in ascending order by Device ID 230. The report 400 can be searched by Device ID 230, Battery Percentage 410, Route ID 460, and Employee ID 470. The total timespan 450 can be used by the hub 130 to evaluate the health of the battery 124 by determining how long a battery was in use and how quickly the state of charge went down, and over what period of time the decrease in charge happened. Where a charge decreases very quickly over a short period of time, the hub 130 can determine that the battery 124 may need attention or replacement. When the hub 130 determines a battery needs replacement, or will soon need a replacement, the hub 130 can automatically order a replacement battery.

Figure 5:
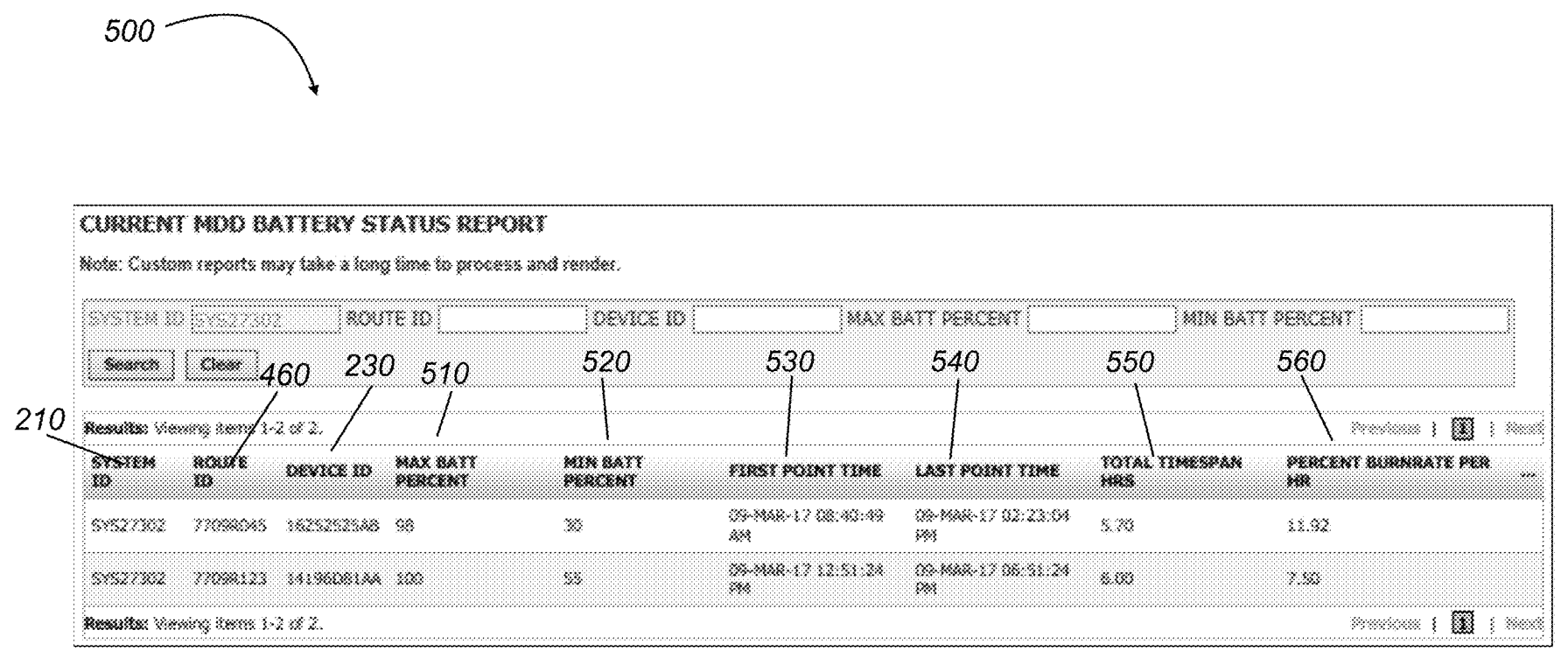

FIG. 5 shows an example image of a report entitled "Current MDD Battery Status Report" 500 that may be generated based on the data transmitted to a management module in a system for monitoring and replacing batteries. The Current MDD Battery Status Report 500 permits the user to view the current battery 124 status for each mobile computing device 120 currently sending battery status information. The report is specific to the current facility 128, listed with its unique System ID 210. The report 500 is exportable to an EXCEL or CSV file. The columns listed on the report are "System ID" 210, "Route ID" 460, "Device ID" 230, "Max Batt Percent" 510, "Min Batt Percent" 520, "First Point Time" 530, "Last Point Time" 540, "Total Timespan HRS" 550, "Percent Burnrate per HR" 560. The "System ID" 210 of the report 500 is connected to a unique facility 128, such as a postal facility, where the device 120 is currently being stored when it is not being used. Each mobile computing device 120, such as a mobile delivery device, has its own unique device ID that is reported as the Device ID 230. The "Route ID" column 460 reports the unique ID associated with the particular route that the mobile computing device 120 was most recently on. The "Max Batt Percent" 510 column reports the highest battery percentage sent from the device 120 to the management module, likely the battery percentage information sent when the device 120 first sent battery information to the management module for the day. The "Min Batt Percent" 520 column reports the lowest battery percentage information sent from the device 120 to the management module. The "First Point Time" 530 column reports the time when the battery information was first received by the management module. The "Last Point Time" 540 column reports the time when the last battery information was received by the management module for the day. The "Total Timespan HRS" 550 column reports the total time that the device 120 was out of its charging device for the day and is calculated by Last Point Time 540 minus First Point Time 530. The "Percent Burnrate per HR" 560 column reports a calculation of the percentage of battery loss per hour. The report 500 is sorted in descending order by Percent Burnrate Per HR 560. The report 500 can be searched by any of the following fields: Route ID 460, Device ID 230, MAX BATT Percent 510, MIN BATT Percent 520. In some embodiments, the system is configured to automatically order replacement batteries that exceed a specified burn rate for two consecutive days, or for some other specified time. In some embodiments the device 120 will flash at the user if it is determined that the device 120 will likely not have sufficient battery life or power to complete the specified route, calculated by using the average time based on averaging the Total Timespan Hrs. 550 of a particular Route ID 460, and calculating the life of the particular Device ID 230 based on the Battery Percentage 410 and the Percent Burnrate per HR 560. When the hub 130 determines a battery needs replacement, or will soon need a replacement, based on the information and calculations of the current MDD Battery Status Report 500, the hub 130 can automatically order a replacement battery.

Figure 6:
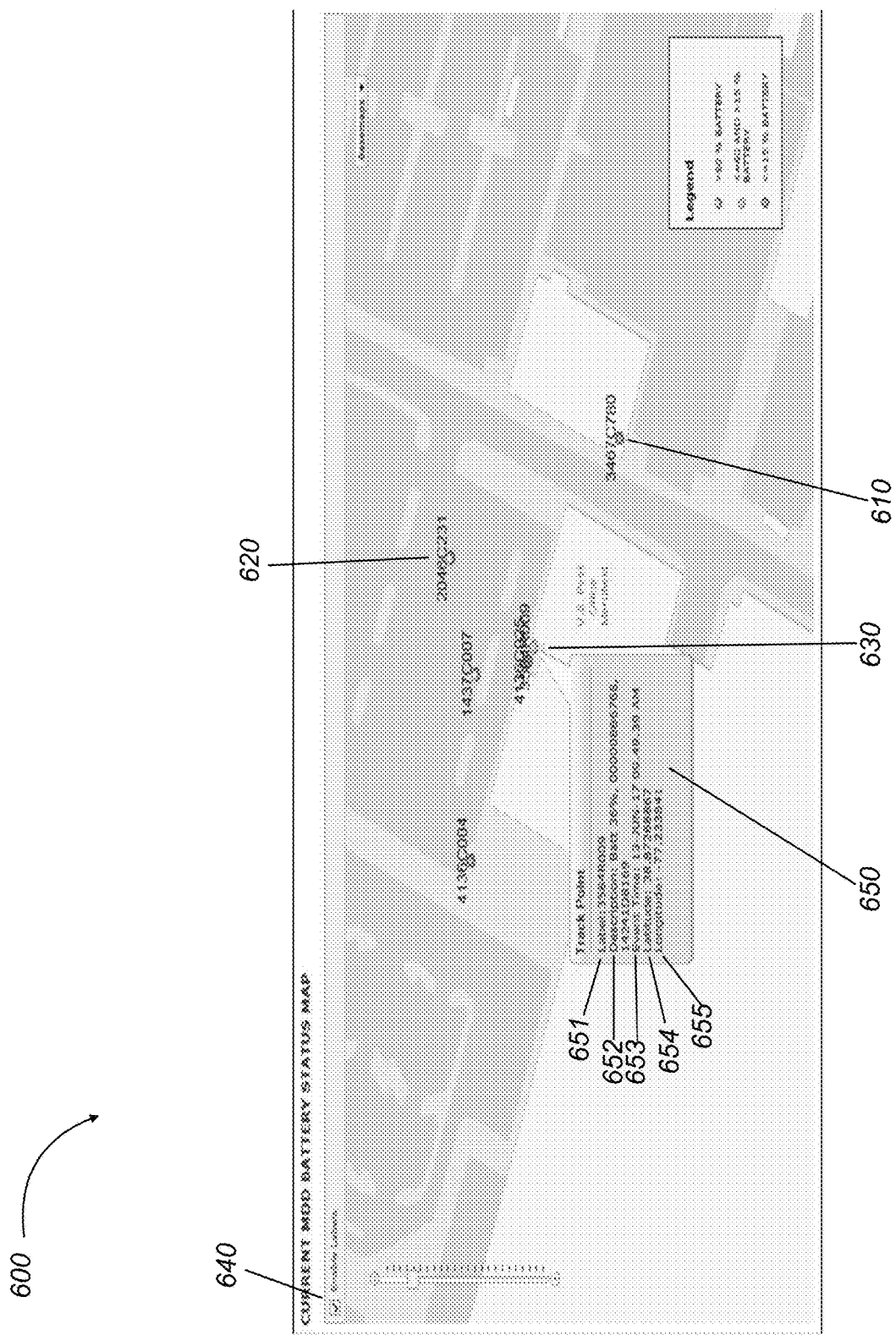
FIG. 6 is an example image of an interactive map entitled "Current MDD Battery Status Map" generated based on the data transmitted to a management module in a system for monitoring and replacing batteries.

FIG. 6 shows an example image of a map entitled "Current MDD Battery Status Map" 600 that may be generated based on the data transmitted to a management module in a system for monitoring and replacing batteries. The Current MDD Battery Status Map 600 shows the location and battery information of the devices 120 that are currently sending GPS data 126 to the management module. Each battery containing device is represented by a marker 610, 620, 630 and an identifier for each device 120. The markers 610, 620, and 630 can be color coded to indicate a device battery level, although this is not shown on FIG. 6. For example, if the marker 610 is red, this can indicate to a supervisor or other personnel viewing the status map 600 that the battery 124 level is less than a specified threshold, such as 15%. A green marker 620 can indicate that the battery level is greater than a specified threshold, such as 60% and an orange circle 630 can indicates that the battery level is within a specified range, such as between 15% and 60%. Clicking on "Enable Labels" 640 displays the Route ID 460 currently assigned to each device shown on the map 600. For more information about a device 120 and its battery information, a user can hover over the marker 610, 620, 630 in question. A pop up 650 is displayed with the following information: "Label" 651, "Description" 652, "Event time" 653, "Latitude" 654, and "Longitude" 655. "Label" 651 indicates the Route ID 460 currently associated with the device 120. "Description" 652 includes the battery level percentage 410, employee ID 470, and Device ID 230 currently associated with the device 120. "Event time" 653 is the time that the last battery information was received by the management module. This map 600 can be used by a supervisor or manager if an employee associated with a particular employee ID 470 is using a device 120 associated with a particular Device ID 230 that needs to be replaced because of insufficient battery or other issues. The hub 130 can preemptively alert an operator or supervisor that the battery of a mobile computing device 120 in the field will lose power before the end of the route. The hub 130 can instruct a supervisor, operator, or other carrier to meet with the carrier with the mobile computing device 120 that needs battery replacement to swap a battery or to provide a new battery.

In some embodiments, the hub 130 can identify a mobile computing device 120, such as at marker 610, which is estimated not to have enough power to complete the assigned route. The hub 130 can determine that a mobile computing device 120, such as at marker 620, is nearing the end of the route, or the end of scheduled deliveries for the day, and the mobile computing device 120 has a high, medium, or sufficient battery charge and estimated battery time to complete the route of the mobile computing device 120 which has insufficient battery. The hub 130 can instruct the carrier with the mobile computing device 120 which has sufficient power to meet with the carrier with the low battery, and to swap mobile computing devices, or to exchange batteries.

Figure 7:
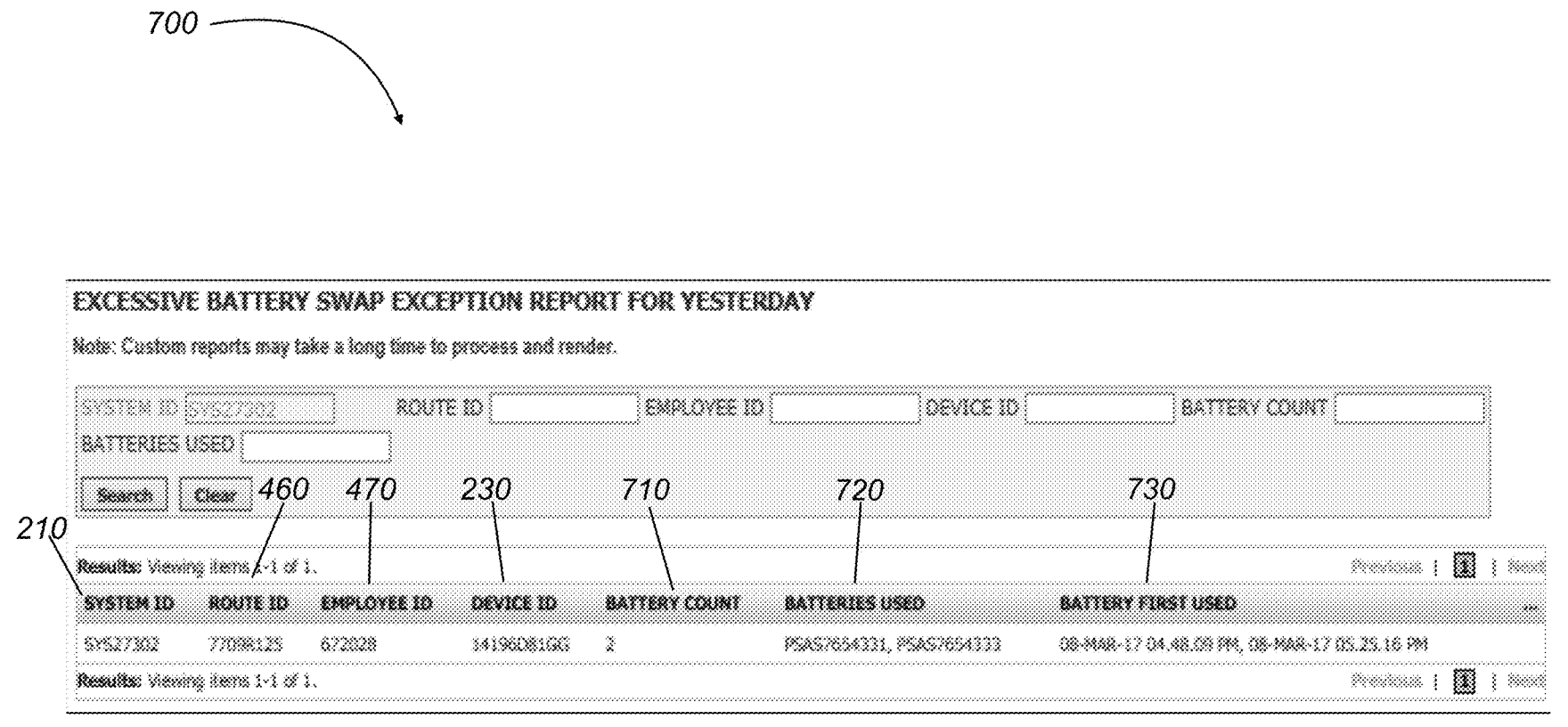

FIG. 7 shows an example image of a report entitled "Excessive Battery Swap Exception Report for Yesterday" 700 that may be generated based on the data transmitted to a management module in a system for monitoring and replacing batteries. The Excessive Battery Swap Exception Report for Yesterday 700 is a custom report listing devices that used more than one battery on the previous day. The report 700 is specific to the current facility 128 (labeled as System ID 210). Data on the report 700 is exportable to an EXCEL or CSV file. The columns on the report 700 are "System ID" 210, "Route ID" 460, "Employee ID" 470, "Device ID" 230, "Battery Count" 710, "Batteries Used" 720, "Battery First Used" 730. The "System ID" 210 of the report 400 is connected to a unique facility 128, such as a postal facility, where the device 120 is currently being stored when it is not being used. The "Route ID" column 460 reports the unique ID associated with the particular route that the device 120 was most recently on. The "Employee ID" column 470 reports the unique ID associated with the most recent employee to use the mobile computing device 120. Each mobile computing device 120, such as an MDD, has its own unique device ID that is reported as the Device ID 230. The "Battery Count" column 710 reports the number of batteries 124 used by the device 120 for the day. The "Batteries Used" column 720 reports the serial number or unique ID of each of the batteries 124 used by the device 120 for the day. The "Battery First Used" column 730 reports the date and time when the module first received the GPS and battery information 122 for each of the batteries 124 used by the device 120. The report 700 is sorted in descending order by Battery Count 710. The report 700 is searchable by Route ID 460, Employee ID 470, Device ID 230, Battery Count 710, and Batteries Used 720. This report 700, and/or the information used to generate the report may be used by the hub 130 to determine if there is something wrong with a particular device 120, rather than something wrong with a particular battery 124. For example, a device that has low battery or insufficient battery reports within a short time period, such as one day, or one shift, or a device that the user has swapped the battery on multiple times within a short period, indicates that the mobile computing device 120 has a problem, rather than determining that multiple batteries have problems.

Figure 8:
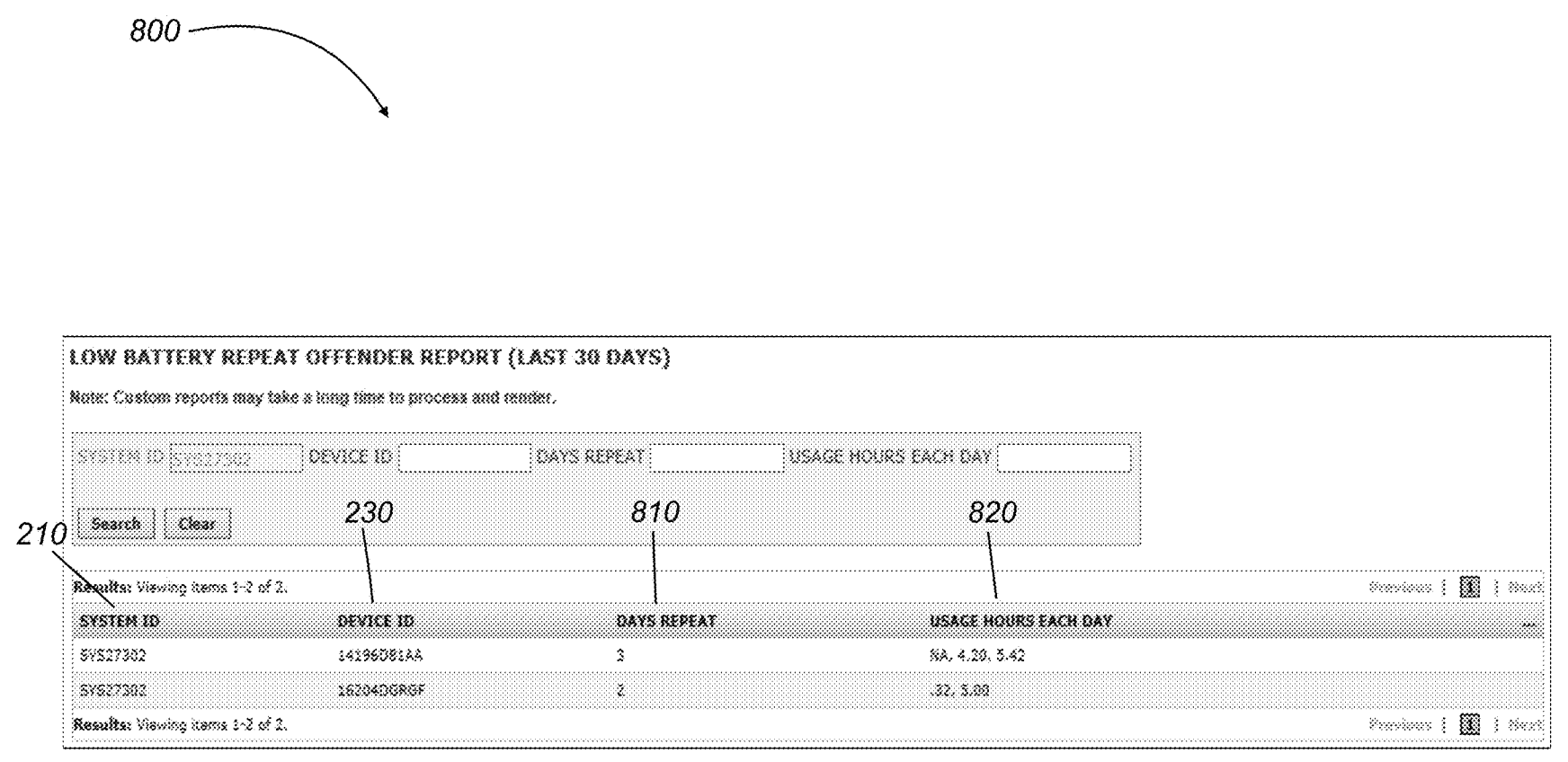

FIG. 8 shows an example image of a report entitled "Low Battery Repeat Offender Report" 800 that may be generated based on the data transmitted to a management module in a system for monitoring and replacing batteries. The Low Battery Repeat Offender Report 800 is a custom report that lists devices 120 and the number of days for which the device's 120 battery strength percentage went below a specified number, such as 15% over the past 30 days. The report 800 is specific to the current facility 128 (labeled System ID 210). Data in the report 800 can be exported to an EXCEL or CSV file. The columns on the report 800 are "System ID" 210, "Device ID" 230, "Days Repeat" 810, "Usage Hours Each Day" 820. The "System ID" 210 of the report 800 is connected to a unique facility 128, such as a postal facility, where the device 120 is currently being stored when it is not being used. Each mobile computing device 120, such as a mobile delivery device, has its own unique device ID that is reported as the Device ID 230. The "Day's Repeat" column lists the number of days that the strength of the battery 124 in the device 120 went below a specified number, such as 15%, over a specified number of days, such as 30 days. The "Usage Hours Each Day" 820 reports the number of hours the device 120 sent adequate battery strength information to the module before its strength went below the number specified, such as 15%, for each of the days in the "Days Repeat" column 810. A DEPART2ROUTE scan is performed for each mobile delivery device 120 when the device user scans that he or she is on the way from the facility 128 with the current System ID 210 to the specified route. If there is no DEPART2ROUTE Scan sent by the device 120 to the module, then an accurate measure of usage hours cannot be determined and the Low Battery Repeat Offender Report 800 will not be able to calculate and report the "Usage Hours Each Day" 820, so it will report NA for this column 820. The report 800 is sorted in descending order by Days Repeat 810. The report 800 can be searched by Device ID 230, Days Repeat 810, and Usage Hours Each Day 820. This report 800 and/or the information included in this report may be used to determine if there is something wrong with a particular device 120, rather than something wrong with a particular battery 124.

Although some functions are described as being performed by specific components, a person of skill in the art, guided by the current disclosure, would understand that the functions described herein can be performed by other components. For example, a specific feature may be described as being performed by the hub 130. A person of skill in the art would understand that the processor 140 or the mobile computing device 120, or another component could perform the recited function without departing from the scope of the present disclosure.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, mobile delivery devices, multiprocessor systems, microprocessor-based systems, programmable consumer electronics, network PCs, minicomputers, mainframe computers, distributed computing environments that include any of the above systems or devices, and the like.

The present disclosure refers to processor-implemented steps for processing information in the system. Instructions can be implemented in software, firmware or hardware and include any type of programmed step undertaken by components of the system.

The processors or processing units described herein may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The system hub 210 may comprise a processor 212 such as, for example, a microprocessor, such as a Pentium® processor, a Pentium® Pro processor, a 8051 processor, a MIPS® processor, a Power PC® processor, an Alpha® processor, a microcontroller, an Intel CORE i7®, i5®, or i3® processor, an AMD Phenom®, A-series®, or FX® processor, or the like. The processors 212 and 305 typically have conventional address lines, conventional data lines, and one or more conventional control lines.

The system may be used in connection with various operating systems such as Linux®, UNIX®, MacOS®, or Microsoft Windows®.

The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python, or Ruby.

Those of skill will further recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Memory Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several systems, methods, and materials of the present invention. This invention is susceptible to modifications in the systems, methods, and materials, as well as alterations in the fabrication of the systems, methods, and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention and as embodied in the attached claims.

What is claimed is:

1. A system for tracking battery usage of a mobile delivery device within a distribution network, the system comprising:
a mobile delivery device comprising:
a battery comprising a battery identifier;
a scanner;
a memory storing a unique device identifier and battery information;
a global positioning system (GPS);
a processor in communication with the battery; and
a communications circuit in communication with the processor;
a delivery facility having a unique delivery facility identifier; and
a server in communication with the communications circuit of the mobile delivery device, the server configured to:
receive the GPS location, the battery identifier, the battery information, and the unique device identifier from the mobile delivery device;
determine a battery status based on the battery information; and
when the battery status indicates the battery exceeds a determined battery threshold, cause an inventory management system:
to order a new battery for the mobile delivery device, identify the delivery facility with which the mobile delivery device is associated based on the GPS location and the unique device identifier, and
to transmit a message to the delivery facility with which the mobile delivery device is associated that the new battery is on its way.

2. The system of claim 1, wherein the battery information comprises one or more of a current battery life of the battery and a number battery cycles.

3. The system of claim 1, wherein the determined battery threshold comprises a number of battery charge cycles.

4. The system of claim 1, wherein the determined battery threshold comprises full charge amp-hours.

5. The system of claim 1, wherein the determined battery threshold comprises a comparison between charge percent and item of use.

6. The system of claim 1, wherein the processor further causes the inventory management system to ship a new battery to the delivery facility with which the mobile delivery device is associated.

7. The system of claim 1, wherein the processor is further configured to send a signal to the mobile delivery for which the new battery has been ordered.

8. The system of claim 7, wherein the signal actuates a visual or audible signal on the mobile delivery device for which the new battery has been ordered.

9. The system of claim 1, wherein the mobile delivery device further comprises a location detection circuit, wherein the location detection circuit is configured to detect a geographic location of the mobile delivery device and to record in the memory the geographic location.

10. The system of claim 9, wherein the processor is configured to, based on the battery status, instruct the mobile delivery device to change the frequency with which the geographic location is recorded in the memory.

11. A method for tracking battery usage comprising:
associating, with a battery-powered mobile delivery device, a delivery facility having a unique delivery facility identifier, the delivery facility configured to store, house, dispense, manage, use, or handle the mobile delivery device;
receiving, from the battery-powered mobile delivery device having the battery, a scanner, a memory and a communications circuit, an unique device identifier, a battery identifier, a global positioning system (GPS) location and battery information;
determining, in a processor, a battery status based on the received battery information;
when the battery status indicates the battery exceeds a determined battery threshold, causing an inventory management system:
to order a new battery for the mobile delivery device, identify the delivery facility with which the mobile delivery devise is associated based on the GPS location and the unique device identifier, and
to transmit a message to the delivery facility with which the mobile delivery device is associated that the new battery is on its way.

12. The method of claim 11, wherein the battery information comprises one or more of a current battery life of the battery and a number battery cycles.

13. The method of claim 11, wherein the determined battery threshold comprises a number of battery charge cycles.

14. The method of claim 11, wherein the determined battery threshold comprises full charge amp-hours.

15. The method of claim 11, wherein the determined battery threshold comprises a comparison between charge percent and item of use.

16. The method of claim 11, further comprising:
receiving, in the inventory management system the order for the new battery; and
shipping, in response to the order, the new battery to the delivery facility with which the mobile delivery device is associated.

17. The method of claim 11, further comprising sending, by a processor, a signal to the mobile delivery device for which the new battery has been ordered.

18. The method of claim 17, wherein the signal actuates a visual or audible signal on the mobile delivery device for which the new battery has been ordered.

19. The method of claim 11, further comprising, recording, in memory of the mobile a geographic location determined by a location detection circuit of the mobile delivery device.

20. The method of claim 19, further comprising, instructing, via a processor, the mobile delivery device to change the frequency with which the geographic location is recorded in the memory, based at least in part on the determined battery status.

* * * * *